United States Patent [19]

Isenberg

[11] Patent Number: 4,597,170

[45] Date of Patent: Jul. 1, 1986

[54] METHOD OF MAKING AN ELECTRODE

[75] Inventor: Arnold O. Isenberg, Forest Hills Boro, Pa.

[73] Assignee: Westinghouse Electric Corp., Pittsburgh, Pa.

[21] Appl. No.: 716,865

[22] Filed: Mar. 28, 1985

[51] Int. Cl.[4] ............................................. H01M 6/00
[52] U.S. Cl. .................................... 29/623.5; 29/623.1
[58] Field of Search .......................... 29/623.5, 623.1; 252/425.3; 156/60; 228/903

[56] References Cited

U.S. PATENT DOCUMENTS 4,242,426 12/1980 Arendt ............................ 29/623.5 X
4,499,663 2/1985 Zwick et al. ...................... 29/623.1

Primary Examiner—Charles F. LeFevour
Attorney, Agent, or Firm—R. D. Fuerle

[57] ABSTRACT

Disclosed is a method of coating an electrode on a solid oxygen conductive oxide layer. A coating of particles of an electronic conductor is formed on one surface of the oxide layer and a source of oxygen is applied to the opposite surface of the oxide layer. A metal halide vapor is applied over the electronic conductor and the oxide layer is heated to a temperature sufficient to induce oxygen to diffuse through the oxide layer and react with the metal halide vapor. This results in the growing of a metal oxide coating on the particles of electronic conductor, thereby binding them to the oxide layer.

15 Claims, 2 Drawing Figures

METHOD OF MAKING AN ELECTRODE

The Government of the United States of America has rights in this invention pursuant to Contract No. DE-AC0280-ET17089, awarded by the U.S. Department of Energy.

CROSS REFERENCE TO RELATED APPLICATION

This application is related to application Ser. No. 716,864 filed Mar. 28, 1985, by A. O. Isenberg and G. E. Zymboly, entitled "High Performance Cermet Electrode."

BACKGROUND OF THE INVENTION

A fuel cell, in one embodiment, consists of a support tube over which is deposited an air electrode layer, followed by a layer of an electrolyte, and then a layer of a fuel electrode. The fuel electrode material generally consists of a sintered powdered metal or metal oxide. Since the fuel cell operates at high temperatures, the materials selected for use in it must be compatible in chemical, electrical, and physical-mechanical characteristics, such as thermal expansion. A thermal expansion mismatch between two contacting cell components is a serious concern as it may lead to cracking or delamination.

While the best material for fuel electrodes in a fuel cell is currently believed to be nickel or cobalt, there is a discrepancy factor of about 1.6 between the coefficient of thermal expansion of these metals and the coefficient of thermal expansion of materials used to make the electrolyte in the fuel cell. As a result, when the fuel cell is thermally cycled between room temperature and operating temperature, the interface between the electrolyte and the fuel electrode is severely stressed, which can lead to a separation and loss of contact between these two components. Since close contact is essential to obtain a low cell resistance and therefore a high performance, this problem prevents the fuel cell from operating efficiently.

Besides the purely thermal-mechanical problems that exist at the fuel electrode-electrolyte interface, there are electrochemical effects which also reduce the mechanical stability at the interface. At the interface, fuel, such as hydrogen and carbon monoxide, react with oxygen ions from the electrolyte to form water vapor and carbon dioxide. If the water vapor cannot easily escape from the area where it is formed, it can force the electrode off the electrolyte. Other forces are also at work at the interface whih are not yet well understood and which affect the adherence of the electrode to the electrolyte, such as the wetting behavior of metals, which is a function of the gas composition and its oxygen activity. Until now, the problem of the adherence of the electrode to the electrolyte has been attacked by sintering, plasma (flame) spraying, and sputtering the electrode onto the electrolyte. These methods have met with little success, and often they are not feasible because they are uneconomic and do not produce electrodes with the correct pore structure. The sintering of slurry coatings of zirconia, mixed with nickel or cobalt oxides, has been attempted with little success because, in the preferred fuel cell structure, the fuel electrode application is the last step in the sequence of several cell component fabrication steps. In order to prevent damage to the other components, the fuel electrode sintering temperature in this case must be restricted to a maximum of 1300° to 1350° C., which is too low to form a good electrode bond to the electrolyte using that composition.

SUMMARY OF THE INVENTION

I have discovered a method of making a cermet electrode on an electrolyte so that the electrode is firmly bonded to the electrolyte yet is porous to the gases which react in the fuel cell. The method of this invention is applicable to a wide variety of electrode materials.

DESCRIPTION OF THE INVENTION

Figure 1:
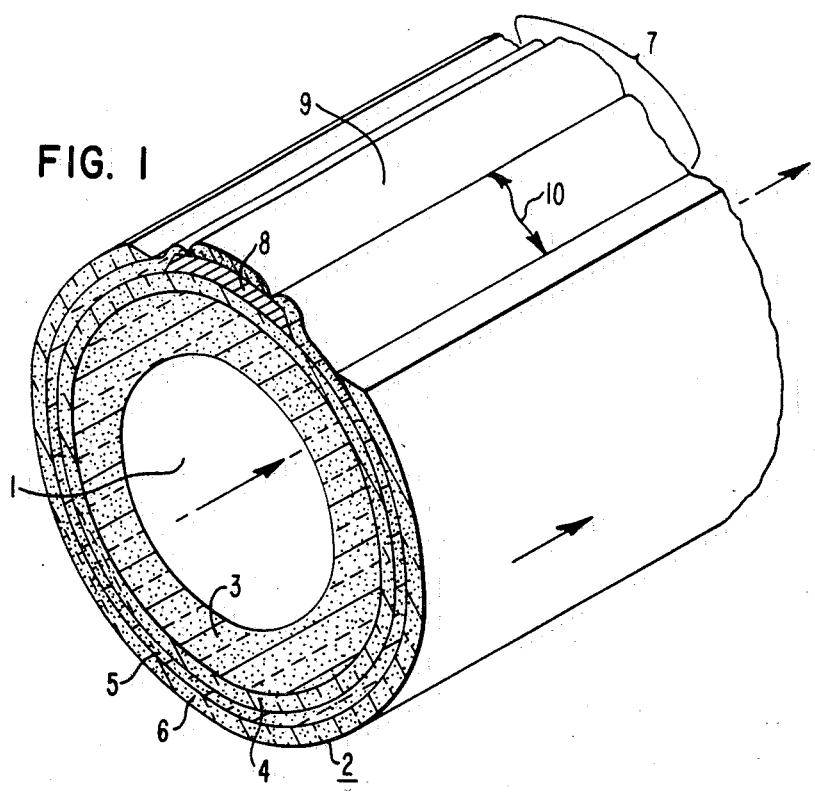
FIG. 1 is an isometric view in section of a certain presently preferred embodiment of a tubular solid oxide fuel cell according to this invention.

In FIG. 1, air flowing through the center 1 of tube 2 permeates through porous support tube 3 to air electrode 4 where the oxygen is converted to oxygen ions. The oxygen ions are conducted through electrolyte 5 to fuel electrode 6 where they react with fuel to generate electricity. Also shown in the drawing are longitudinal space 7 containing an interconnection 8 for making electrical connections from the underlying air electrode to the fuel electrode 6 of a cell tube (not shown) lying next to it, and an electronically insulating gap 10. A metal or fuel electrode type of material code 9 is coated over interconnection 8.

Figure 2:
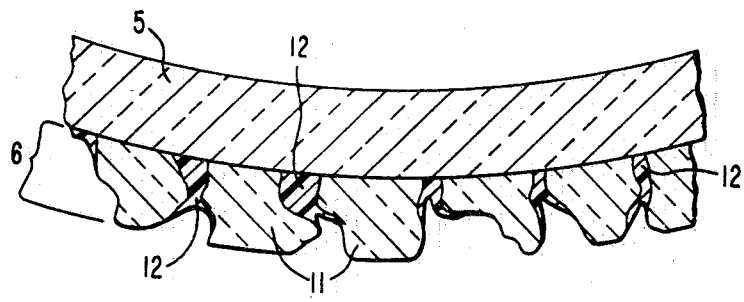
FIG. 2 is a schematic end view in section showing a certain presently preferred fuel electrode on an electrolyte according to this invention.

FIG. 2 gives a much enlarged and detailed view of the structure of the fuel electrode. In FIG. 2, an electrolyte 5 is coated with particles 11 of a conductor which forms the fuel electrode. A porous skeletal coating 12 covers portions of the particles 11 and binds them to the electrolyte 5.

The electrolyte used in this invention can have any shape as long as it has two opposing surfaces. The preferred shape is a tube sealed at one end, as that configuration is the most useful for solid oxide fuel cells. The thickness of the electrolyte is not critical but it must be a solid material through which oxygen can diffuse or permeate in a solid state diffusion. The electrolyte can also be partially electronically conductive besides conducting oxygen ions. The electrolyte material is preferably an oxide having a fluorite structure or a mixed oxide in the pervoskite family, but other simple oxides, mixed oxides, or mixtures of simple and mixed oxides can be used. The preferred electrolyte material is stabilized zirconia, a readily available commercial material. The zirconia may be stabilized with a number of elements, as is well known in the art, but yttria stabilized zirconia is preferred as it has excellent oxygen ion mobility. A preferred composition is $(ZrO_2)_{0.90}(Y_2O_3)_{0.10}$ as that material works well in solid oxide fuel cells. Other mixed oxides can be used, including yttrium doped thorium oxide and lanthanum doped ceria. The method of this invention is applicable to oxide layers that transfer oxygen in any form including monoatomic oxygen as well as ionic oxygen.

The conductive material that forms the electrode is a particulate material of any size and thickness. Best results have been obtained using particles about 1 to about 5 microns thick, however, as it is difficult to make larger particles adhere to the electrolyte. A preferred electrode thickness is about 50 to about 200 microns, though the thickness is adjusted to the desired conductivity of the cell. Any material which is an electronic conductor can be used to form the electrode. Metals are preferred as they are more conductive and therefore more useful, but oxides can also be used, particularly if the electrode will be in an oxidizing atmosphere. Metals are preferred to metal oxides for a fuel cell because the atmosphere is reducing. Metals that can be used include platinum, gold, silver, copper, nickel, cobalt, iron, and alloys and mixtures thereof. Metal oxides that can be used include chromic oxide, lanthanum chromite, and lanthanum manganite. The preferred materials are nickel, cobalt, and alloys and mixtures thereof as these metals are less expensive, more stable, more sulfur resistant, and have an acceptable oxidation potential.

The conductor may be applied to the electrolyte as a powder layer in many different ways, including slurry dipping, spraying, and tape transfer. The preferred method of application is a tape transfer technique because of ease of mass fabrication, registering of dimensions, and uniformity in thickness and porosity.

The material that binds the conductor particles to the electrolyte is formed from two reactants. The binding material is preferably selected to be the same material as the electrolyte (or the same material modified by doping) so that a good bond forms between the binding material and the electrolyte and there is a good thermal match between the two materials. Also, doping with, for example, transition metal elements, can lead to a mixed conducting binding material which improves electrode performance.

The first reactant used to form the binding material is a source of oxygen such as water vapor, carbon dioxide, or oxygen itself. The second reactant used to form the binding material are metal halides. Chlorides are preferred as they are inexpensive and have acceptable vapor pressures. The reaction of the first and second reactants produces a metal oxide binding material. For example, the reaction of zirconium chloride with oxygen is given by the following equations:

$$ZrCl_4 + 2O^= \rightarrow ZrO_2 + 2Cl_2 + 4e^-$$

$$4e^- + O_2 \rightarrow 2O^=$$

$$ZrCl_4 + O_2 \rightarrow ZrO_2 + 2Cl_2$$

However, it is believed that the conductor particles also participate in this reaction because chlorides of the conductor metal have been detected in the reaction products. The following equation gives a possible reaction for zirconium chloride and oxygen where nickel is the conductor.

$$ZrCl_4 + 2Ni + 2O^= \rightarrow ZrO_2 + 2NiCl_2 + 4e^-$$

$$O_2 + 4e^- \rightarrow 2O^=$$

$$ZrCl_4 + 2Ni + O_2 \rightarrow ZrO_2 + 2NiCl_2$$

If the binding material is to be stabilized zirconia or a mixed oxide, it will, of course, be necessary to use a mixture of a zirconium halide and a halide of the stabilizing element as the second reactant. The proportion of the two halides in the mixture is selected to produce the desired composition of the binding material, and may not be the same as the proportion of the metals in the binding material, due to differences in the reaction rates of the two metal halides.

To bind the conductor material to the electrolyte, the first reactant, the source of oxygen, is passed over the opposite side of the electrolyte from the conductor, and the second reactant, the mixture of metal halides, is passed over the conductor. The reactants and the electrolyte are heated to the temperature at which the electrolyte conducts the oxygen and the reaction occurs to produce the binding material. This temperature is preferably about 1,000° to about 1,400° C. Typically, about 1 to about 30 minutes is required to produce sufficient binding material to adequately bind the conductor particles to the electrolyte. Of course, the reaction proceeds faster at higher temperatures. The reaction should be continued until the desired degree of binder material build up is obtained and the electrode is as strong as desired. High densities should be avoided for fuel electrodes as fuel electrodes must still be permeable to the gases used in operating a fuel cell.

The method of this invention, in addition to producing fuel electrodes for solid oxide fuel cells, can also be used to produce electrodes for solid state electrolyzers and gas sensors.

Although the method of this invention is particularly applicable to electrochemical cells, such as a fuel cell, the method of attachment of electronically conducting layers of metals or oxides to a ceramic surface that exhibits ionic or mixed ionic-electronic conduction can also be applied to other applications such as electronic contacts, wear resistant contacts, and composite layers.

The following example further illustrates this invention.

EXAMPLE

A tube was prepared 400 mm long and 13 mm in diameter consisting of a 2 mm thick porous support tube of calcia stabilized zirconium, a 1 mm thick air electrode of doped lanthanum manganite on top of the support tube, and a 50 μm thick electrolyte of yttria stabilized zirconia $(ZrO_2)_{0.90}(Y_2O_3)_{0.10}$ on the air electrode. A 100 micron thick layer of five micron nickel powder was deposited over the electrolyte by means of slurry dipping. The nickel powder was about 50% porous.

The tube was placed in a graphite line reactor tube in a furnace and a second tube was inserted into the cell tube to provide for a flow of oxygen through the inside of the cell tube. The furnace was heated at 1,200° C. and a vacuum of 0.1 mm of mercury was applied to the outside of the tube. A mixture of vapors containing 0.65 grams zirconium tetrachloride per minute and 0.1 gram of yttrium chloride per minute was passed over the outside of the tube. The oxygen flow on the inside of the cell tube was maintained under a vacuum of 1 mm of mercury at a rate of 100 ml of oxygen per minute at STP. The surface area of the tube subject to the reaction was about 100 cm². The reaction was continued for 10 minutes and the tube was slowly cooled.

Microscopic examination of the electrode showed that a skeleton of yttria stabilized zirconia had grown between the nickel particles, bonding them to the electrolyte, as is illustrated in FIG. 2. The skeleton of yttria stabilized zirconia was about 1 to 5 microns thick. The electrode would not scrape off without destroying the entire cell structure. The completed fuel cell was used in operation for over a year without the electrode detaching from the electrolyte. Identical cells prepared without the yttria stabilized zirconia skeleton would detach from the electrolyte within hours of fuel cell operation.

I claim:

1. A method of bonding an electronically conductive layer on a solid, oxygen transporting oxide layer comprising:
   (A) forming a coating of particles of an electronic conductor on a first surface of said oxide layer;
   (B) applying a source of oxygen to a second surface of said oxide layer;
   (C) applying a metal halide vapor to said first surface of said oxide layer;
   (D) heating said oxide layer to a temperature sufficient to induce oxygen to diffuse through said oxide layer and react with said metal halide vapor, whereby a metal oxide coating grows on said particles of said electronic conductor.

2. A method according to claim 1 wherein said oxide layer is a tube, sealed at one end.

3. A method according to claim 1 wherein said oxide layer consists of stabilized zirconia.

4. A method according to claim 3 wherein said stabilized zirconia is yttria stabilized zirconia.

5. A method according to claim 4 wherein said yttria stabilized zirconia is $(ZrO_2)_{0.90}(Y_2O_3)_{0.10}$.

6. A method according to claim 1 wherein said particles are about 1 to about 100 microns in size.

7. A method according to claim 1 wherein said electronic conductor is a metal selected from the group consisting of platinum, gold, copper, nickel, cobalt, iron, and alloys and mixtures thereof.

8. A method according to claim 7 wherein said electronic conductor is selected from the group consisting of cobalt, nickel, and alloys and mixtures thereof.

9. A method according to claim 1 wherein said source of oxygen is selected from the group consisting of oxygen, water, carbon dioxide, and mixtures thereof.

10. A method according to claim 1 wherein said metal halide vapor is a metal chloride vapor.

11. A method according to claim 1 wherein said metal halide vapor is a mixture of zirconium chloride and a chloride of a metal, the oxide of which stabilizes zirconia, in a proportion suitable to produce stabilized zirconia.

12. A method according to claim 1 wherein said temperature is about 1000° to about 1400° C. for about 1 to about 30 minutes.

13. A method according to claim 1 wherein said electronically conducting layer is an oxide selected from the group consisting of simple oxides, mixed oxides, and mixtures thereof.

14. A method according to claim 1 wherein said oxide layer is selected from the group consisting of doped lanthanum chromite, doped lanthanum manganite, or chromic oxide.

15. A method of making a fuel electrode on a solid oxide tube sealed at one end, comprising:
   (A) forming a layer about 50 to about 200 microns thick of metal particles about 1 to about 100 microns in size over the outside of said tube, said metal particles being selected from the group consisting of nickel, cobalt, and alloys and mixtures thereof;
   (B) passing a source of oxygen selected from the group consisting of oxygen, water, carbon dioxide, and mixtures thereof, through the inside of said tube;
   (C) passing a vaporous mixture of zirconium chloride and a chloride of a metal, the oxide of which stabilizes zirconia, in a proportion suitable to produce stabilized zirconia, over the outside of said tube; and
   (D) heating said tube to about 1000° to about 1400° for about 1 to about 30 minutes to produce a skeleton of stabilized zirconia on said particles.

* * * * *